US008288495B2

(12) United States Patent
Tamura et al.

(10) Patent No.: US 8,288,495 B2
(45) Date of Patent: Oct. 16, 2012

(54) PROPYLENE HOMOPOLYMER FOR CAPACITORS

(75) Inventors: Satoshi Tamura, Ichihara (JP); Keita Itakura, Ichihara (JP); Satoshi Hashizume, Ichihara (JP)

(73) Assignees: Mitsui Chemicals, Inc., Tokyo (JP); Prime Polymer Co., Ltd., Tokyo (JP)

( * ) Notice: Subject to any disclaimer, the term of this patent is extended or adjusted under 35 U.S.C. 154(b) by 0 days.

(21) Appl. No.: 13/146,378

(22) PCT Filed: Jan. 26, 2010

(86) PCT No.: PCT/JP2010/050961
§ 371 (c)(1),
(2), (4) Date: Jul. 26, 2011

(87) PCT Pub. No.: WO2010/087328
PCT Pub. Date: Aug. 5, 2010

(65) Prior Publication Data
US 2011/0301309 A1     Dec. 8, 2011

(30) Foreign Application Priority Data

Jan. 27, 2009   (JP) .................................. 2009-015053

(51) Int. Cl.
*C08F 110/06* (2006.01)
*C08F 4/642* (2006.01)

(52) U.S. Cl. ...................... 526/348.1; 526/351; 526/904

(58) Field of Classification Search ................ 526/348.1, 526/351, 904
See application file for complete search history.

(56) References Cited

U.S. PATENT DOCUMENTS

| | | | |
|---|---|---|---|
| 5,476,709 A | 12/1995 | Inoue et al. |
| 5,504,172 A | 4/1996 | Imuta et al. |
| 5,573,840 A | 11/1996 | Inoue et al. |
| 5,739,366 A | 4/1998 | Imuta et al. |
| 5,767,033 A | 6/1998 | Imuta et al. |
| 5,959,046 A | 9/1999 | Imuta et al. |
| 6,063,482 A | 5/2000 | Peiffer et al. |
| 6,063,483 A | 5/2000 | Peiffer et al. |
| 6,071,598 A | 6/2000 | Peiffer et al. |
| 6,086,982 A | 7/2000 | Peiffer et al. |
| 6,350,828 B1 | 2/2002 | Takaoka et al. |
| 6,770,723 B2 | 8/2004 | Fujita et al. |
| 6,875,718 B2 | 4/2005 | Fujita et al. |
| 6,939,928 B1 | 9/2005 | Kawai et al. |
| 7,081,299 B2 | 7/2006 | Richeson |
| 7,098,277 B2 | 8/2006 | Lin et al. |
| 7,235,618 B2 | 6/2007 | Lin et al. |
| 7,300,903 B2 | 11/2007 | Fujita et al. |
| 7,449,533 B2 | 11/2008 | Kawai et al. |
| 7,914,899 B2 | 3/2011 | Stadlbauer et al. |
| 2010/0234541 A1 | 9/2010 | Karbasi et al. |

FOREIGN PATENT DOCUMENTS

| | | |
|---|---|---|
| JP | 56-131921 | 10/1981 |
| JP | 06-236709 A | 8/1994 |
| JP | 07-145212 | 6/1995 |
| JP | 09-001652 | 1/1997 |
| JP | 09-052917 A * | 2/1997 |
| JP | 09-302036 | 11/1997 |
| JP | 11 315100 A | 11/1999 |
| JP | 2004-506788 | 3/2004 |
| JP | 3618130 | 11/2004 |
| JP | 2006-143975 | 6/2006 |
| JP | 4083820 | 2/2008 |
| WO | WO-01/27124 A1 | 4/2001 |
| WO | WO-2007/134837 A1 | 11/2007 |
| WO | WO-2008/006529 A1 | 1/2008 |

OTHER PUBLICATIONS

Machine translation of JP 09-052917A; published Feb. 1997.*
International Search Report in PCT/JP2010/050961 dated Apr. 20, 2010.

* cited by examiner

*Primary Examiner* — Fred M Teskin
(74) *Attorney, Agent, or Firm* — Foley & Lardner LLP

(57) ABSTRACT

[Object] To provide a propylene homopolymer suitable for capacitor films having high withstand voltage and a stretched film formed by stretching the propylene homopolymer.
[Solution] A propylene homopolymer of the present invention for capacitors satisfies the following requirements (i) to (v) and (ix): (i) the MFR is 1 to 10 g/10 minutes; (ii) the meso pentad fraction (mmmm) measured by $^{13}$C-NMR is 0.940 to 0.995; (iii) the integrted amount of elution at 90° C. by CFC using o-dichlorobenzene is 0.5% by weight or less; (iv) the melting point measured using DSC is 152° C. or more; (v) the chlorine content is 2 ppm by weight or less; and (ix) in an elution temperature-elution volume curve measured by cross-fractionation chromatography (CFC) using o-dichlorobenzene, the maximum peak has a peak top temperature in the range of 105° C. to 130° C. and half width of 7.0° C. or less.

4 Claims, No Drawings

PROPYLENE HOMOPOLYMER FOR CAPACITORS

TECHNICAL FIELD

The present invention relates to propylene homopolymers having high withstand voltage and suitable for capacitor films and stretched films formed thereof for capacitors.

BACKGROUND ART

Polypropylene, having superior stretch properties, can be formed into uniform thin films and has been widely used in various fields because of its superior properties. Polypropylene has also been widely used for capacitor films because of its superior electrical properties. Recently, the demand for capacitor films has been growing in the fields of household appliances and automobiles, and there is a need for further improvements in the withstand voltage of capacitor films formed of propylene.

For further improvements in the withstand voltage of capacitor films formed of propylene, various propylenes have been proposed. Among those are, for example, a propylene with increased tacticity whose isotactic pentad fraction in a boiling heptane insoluble fraction is 0.955 or more (see, for example, PTL 1), a propylene with an ash content of 40 ppm by weight or less and a chlorine content of 2 ppm by weight or less (see, for example, PTL 2), and a propylene whose racemic pentad fraction in a boiling n-heptane insoluble fraction is 0.0005 to 0.01 (see, for example, PTL 3). Also proposed are, for example, a propylene with an optimally controlled meso pentad fraction and amount of burnt residue (see, for example, PTL 4), a propylene whose isotactic or syndiotactic pentad fraction in a boiling heptane soluble fraction is 0.5 or more (see, for example, PTL 5), and a propylene produced using a specific metallocene catalyst and having a pentad fraction of 93 mole percent or more, a xylene soluble fraction content of less than 1% by weight, and recoverable contents of aluminum and chlorine of less than 25 ppm (see, for example, PTL 6).

However, only reducing the amount of burnt residue (ash content) of propylenes, improving the tacticity of propylenes, and controlling the heptane or xylene soluble fraction content have not led to a material satisfying the demanded level of withstand voltage, which has been rapidly increasing recently.

CITATION LIST

Patent Literature

PTL 1: Japanese Unexamined Patent Application Publication No. 56-131921
PTL 2: Japanese Unexamined Patent Application Publication No. 6-236709
PTL 3: Japanese Unexamined Patent Application Publication No. 9-302036
PTL 4: Japanese Unexamined Patent Application Publication No. 2006-143975
PTL 5: Japanese Patent No. 3618130
PTL 6: Japanese Unexamined Patent Application Publication (Translation of PCT Application) No. 2004-506788

SUMMARY OF INVENTION

Technical Problem

An object of the present invention is to develop a propylene homopolymer that can provide a capacitor film having high withstand voltage, particularly, a capacitor film having high withstand voltage when formed as a thin film.

Solution to Problem

To solve the above problem, the present inventors have conducted intensive research on propylene homopolymers that could provide capacitor films having high withstand voltage, thus completing the present invention.

That is, the present invention includes the following items.

[1] A propylene homopolymer for capacitors, satisfying the following requirements (i) to (v) and (ix):

(i) the melt flow rate (MFR; measured at 230° C. under a load of 2.16 kg according to ASTM D1238) is 1 to 10 g/10 minutes;

(ii) the meso pentad fraction (mmmm) measured by $^{13}$C-NMR is 0.940 to 0.995;

(iii) the integrated amount of elution at 90° C. by cross-fractionation chromatography (CFC) using o-dichlorobenzene is 0.5% by weight or less;

(iv) the melting point measured using a differential scanning calorimeter (DSC) is 152° C. or more;

(v) the chlorine content is 2 ppm by weight or less; and (ix) in an elution temperature-elution volume curve measured by cross-fractionation chromatography (CFC) using o-dichlorobenzene, the maximum peak has a peak top temperature in the range of 105° C. to 130° C. and half width of 7.0° C. or less.

[2] The propylene homopolymer for capacitors according to [1], further satisfying the following requirement (vi):

(vi) the sum of the proportion of irregularly bonded unit due to 2,1-insertion of propylene monomer and the proportion of irregularly bonded unit due to 1,3-insertion of propylene monomer in all propylene constituent units determined from a $^{13}$C-NMR spectrum is 0.2 mole percent or less.

[3] The propylene homopolymer for capacitors according to [1] or [2], wherein the propylene homopolymer is polymerized using a metallocene catalyst.

[4] A stretched film, for capacitors, formed by stretching the propylene homopolymer according to one of [1] to [3] at an area stretching ratio (area ratio obtained by length×width) of 30 to 80 times.

Advantageous Effects of Invention

The stretched film formed of the propylene homopolymer of the present invention for capacitors has high withstand voltage and is suitable as a capacitor film.

DESCRIPTION OF EMBODIMENTS

Propylene Homopolymer for Capacitors

The propylene homopolymer of the present invention for capacitors is characterized in that it satisfies the following requirements (i) to (v) and (ix) and preferably further satisfies the following requirement (vi):

(i) the melt flow rate (MFR; measured at 230° C. under a load of 2.16 kg according to ASTM D1238) is 1 to 10 g/10 minutes;

(ii) the meso pentad fraction (mmmm) measured by $^{13}$C-NMR is 0.940 to 0.995;

(iii) the integrated amount of elution at 90° C. by cross-fractionation chromatography (CFC) using o-dichlorobenzene is 0.5% by weight or less;

(iv) the melting point measured using a differential scanning calorimeter (DSC) is 152° C. or more;

(v) the chlorine content is 2 ppm by weight or less;

(ix) in an elution temperature-elution volume curve measured by cross-fractionation chromatography (CFC) using o-dichlorobenzene, the maximum peak has a peak top temperature in the range of 105° C. to 130° C. and half width of 7.0° C. or less; and (vi) the sum of the proportion of irregularly bonded unit due to 2,1-insertion of propylene monomer and the proportion of irregularly bonded unit due to 1,3-insertion of propylene monomer in all propylene constituent units determined from a $^{13}$C-NMR spectrum is 0.2 mole percent or less.

A stretched film formed of a propylene homopolymer for capacitors that satisfies the above requirements (i) to (v) and (ix) and preferably further satisfies the above requirement (vi) has high withstand voltage and is suitable as a capacitor film. The individual requirements will now be described in detail.

Requirement (i)

For the propylene homopolymer of the present invention for capacitors, the MFR (ASTM D1238, at 230° C. under a load of 2.16 kg) is 1 to 10 g/10 minutes, preferably 1.5 to 8.0 g/10 minutes. If the MFR falls below 1, it is difficult to form an original fabric by an extruder, and it may be impossible to form a desired stretched film because of, for example, detachment from the chuck during stretching. On the other hand, if the MFR exceeds 10 g/10 minutes, the film productivity may be significantly decreased because of, for example, frequent film breaks during stretching.

Requirement (ii)

For the propylene homopolymer of the present invention for capacitors, the meso pentad fraction (mmmm) measured by $^{13}$C-NMR is 0.940 to 0.995, preferably 0.945 to 0.990. If the meso pentad fraction (mmmm) measured by $^{13}$C-NMR falls below 0.940, it may be impossible to form a film having the desired withstand voltage. If the meso pentad fraction (mmmm) measured by $^{13}$C-NMR exceeds 0.995, it may be impossible to form a film thin enough for capacitors or may be difficult to form a film having a uniform thickness distribution because the stress during stretching is significantly high.

Requirement (iii)

For the propylene homopolymer of the present invention for capacitors, the integrated amount of elution at 90° C. by cross-fractionation chromatography (hereinafter also referred to as "CFC") using o-dichlorobenzene is 0.5% by weight or less, preferably 0.4% by weight or less, more preferably 0.3% by weight or less. If the integrated amount of elution at 90° C. by CFC exceeds 0.5% by weight, it may be impossible to achieve the desired withstand voltage under the withstand voltage measurement conditions described later.

Requirement (iii)'

For the propylene homopolymer of the present invention for capacitors, the integrated amount of elution at 100° C. by CFC is preferably 2.2% by weight or less, more preferably 1.5% by weight or less, still more preferably 1.0% by weight or less. If the integrated amount of elution at 100° C. by CFC falls within the above range, a film formed of the propylene homopolymer tends to have high withstand voltage.

Requirement (iv)

For the propylene homopolymer of the present invention for capacitors, the melting point measured using a differential scanning calorimeter (hereinafter also referred to as "DSC") is 152° C. or more, preferably 153° C. to 166° C. If the melting point measured using DSC falls below 152° C., many problems may arise, including film breaks due to heat applied during metallization for capacitor films and unsatisfactory capacitor characteristics due to thermal shrinkage during processes for producing capacitor devices or in practical use environments. If the melting point measured using DSC exceeds 166° C., it may be impossible to form a film thin enough for capacitors or may be difficult to form a film having a uniform thickness distribution because the stress during stretching is significantly high.

Requirement (v)

For the propylene homopolymer of the present invention for capacitors, the chlorine content is 2 ppm by weight or less (0 to 2 ppm by weight), preferably 1 ppm by weight or less. If the chlorine content exceeds 2 ppm by weight, the polymer contains an increased amount of conductive component, and accordingly the resulting stretched film has a decreased withstand voltage. This may degrade long-term capacitor characteristics.

If, for example, the catalyst used for polymerization of the propylene homopolymer of the present invention contains chlorine, it may remain in the resulting propylene homopolymer. With a metallocene compound described later, the chlorine content can be controlled to the above range.

Requirement (vi)

For the propylene homopolymer of the present invention for capacitors, the sum of the proportion of irregularly bonded unit due to 2,1-insertion of propylene monomer and the proportion of irregularly bonded unit due to 1,3-insertion of propylene monomer in all propylene constituent units determined from a $^{13}$C-NMR spectrum is preferably 0.2 mole percent or less, more preferably 0.15 mole percent or less. If the sum of the proportion of irregularly bonded unit due to 2,1-insertion of propylene monomer and the proportion of irregularly bonded unit due to 1,3-insertion of propylene monomer in all propylene constituent units determined from a $^{13}$C-NMR spectrum exceeds 0.2 mole percent, the crystals of the propylene homopolymer become more irregular, and accordingly the stretched film formed of the propylene homopolymer contains less crystallized component. This may decrease the withstand voltage and increase the heat shrinkage.

Requirement (vii)

For the propylene homopolymer of the present invention for capacitors, the boiling n-heptane insoluble fraction content (hereinafter also referred to as "HI") is preferably 98.0% to 99.9% by weight, more preferably 98.5% to 99.9% by weight. If the HI falls below 98.0% by weight, it may be impossible to form a film having the desired withstand voltage. If the HI exceeds 99.9% by weight, it may be impossible to form a film thin enough for capacitors or may be difficult to form a film having a uniform thickness distribution because the stress during stretching is significantly high.

Requirement (viii)

For the propylene homopolymer of the present invention for capacitors, the xylene soluble fraction content (hereinafter also referred to as "CXS") is preferably 0.1% to 1.0% by weight, more preferably 0.1% to 0.8% by weight. If the CXS falls below 0.1% by weight, it may be impossible to form a film thin enough for capacitors or may be difficult to form a film having a uniform thickness distribution because the stress during stretching is significantly high. If the CXS exceeds 1.0% by weight, it may be impossible to form a film having the desired withstand voltage.

Requirement (ix)

For the propylene homopolymer of the present invention for capacitors, in an elution temperature-elution volume curve measured by cross-fractionation chromatography (CFC) using o-dichlorobenzene, the maximum peak has half width of 7.0° C. or less, more preferably 6.0° C. or less, still more preferably 4.5° C. or less and a peak top temperature in the range of 105° C. to 130° C., more preferably 107° C. to 127° C., still more preferably 110° C. to 125° C.

A half-width of 7.0° C. or less is preferred in that a film having high withstand voltage can be formed, and a peak top temperature of 105° C. to 125° C. is preferred in that a film superior in terms of heat shrinkage ratio and capacitor characteristics and thin enough for capacitors can be formed.

A stretched film formed of the propylene homopolymer for capacitors that simultaneously satisfies the above requirements (i) to (v) and (ix), preferably further satisfies the above requirement (vi), more preferably further satisfies the above requirement (iii)', still more preferably further satisfies the above requirement (vii), and particularly preferably further satisfies the above requirement (viii) is superior in terms of productivity, film properties, and capacitor characteristics, particularly, withstand voltage, and is suitable as a capacitor film.

The propylene homopolymer of the present invention for capacitors is preferably polymerized using the metallocene catalyst described later. Polymerization using a metallocene catalyst is desirable because it can easily yield a propylene homopolymer having a high meso pentad fraction (mmmm) measured by $^{13}$C-NMR, and containing little CXS component which is presumably harmful for the insulation properties.

Method for Producing Propylene Homopolymer

The method for producing the above propylene homopolymer for capacitors is not limited as long as the propylene homopolymer simultaneously satisfies the above requirements (i) to (v) and (ix), preferably further satisfies the above requirement (vi), more preferably further satisfies the above requirement (iii)', still more preferably further satisfies the above requirement (vii), and particularly preferably further satisfies the above requirement (viii). For example, the propylene homopolymer can be produced by a method for polymerizing propylene using a propylene polymerization catalyst such as a supported titanium catalyst or a metallocene catalyst described later.

As the supported titanium catalyst, for example, a polymerization catalyst is preferably used that contains a solid titanium catalyst component containing titanium, magnesium, a halogen, and an internally added electron-donating compound; an organometallic compound containing a metal selected from groups I, II, and III of the periodic table; and an externally added electron-donating compound.

A more specific example of the polymerization catalyst used is a catalyst used for industrial production of propylene polymers (polypropylenes). For example, titanium trichloride or titanium tetrachloride supported on a support such as a magnesium halide and an organoaluminum compound are used. In particular, a catalyst having high activity and originally containing little titanium component is preferably used.

Because the propylene homopolymer according to the present invention is used for capacitor films, catalyst residue needs to be removed by post-treatment if the amount of polymer produced per unit amount of catalyst is small. Also, catalyst residue is preferably removed by post-treatment if the amount of polymer produced is large because the catalyst has high activity. An example of a method for the post-treatment is to clean the propylene homopolymer produced by polymerization with, for example, liquid propylene, butane, hexane, or heptane. At this time, the catalyst components, such as titanium and magnesium, may be solubilized to make them easily extractable by adding, for example, water, an alcohol compound, a ketone compound, an ether compound, an ester compound, an amine compound, an organic acid compound, or an inorganic acid compound. It is also preferable to clean the propylene homopolymer with a polar compound such as water or an alcohol. With such post-treatment, the chlorine content of the resulting propylene homopolymer can be reduced.

On the other hand, as the metallocene catalyst, a polymerization catalyst containing a metallocene compound having cyclopentadienyl backbones in the molecule thereof is preferably used.

The metallocene compound having ligands with cyclopentadienyl backbones in the molecule thereof include as the chemical structure thereof the following two types, namely, a metallocene compound (D1) represented by general formula (I) below and a bridged metallocene compound (D2) represented by general formula (II) below. Of these, the bridged metallocene compound (D2) is preferred.

[Chem. 1]

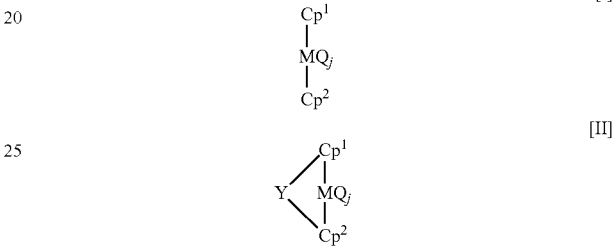

(In general formulas (I) and (II) above, M is a titanium, zirconium, or hafnium atom; Q is a halogen atom, a hydrocarbon group, an anionic ligand, or a neutral ligand that can coordinate with a lone pair of electrons; j is an integer of 1 to 4, where if j is 2 or more, Q may be the same as or different from each other; and $Cp^1$ and $Cp^2$ may be the same as or different from each other and are cyclopentadienyl or substituted cyclopentadienyl groups that can form a sandwich structure with M. Here, the substituted cyclopentadienyl groups include indenyl, fluorenyl, and azulenyl groups and those substituted with one or more hydrocarbyl groups, and for the indenyl, fluorenyl, and azulenyl groups, some of the double bonds of the unsaturated rings fused to the cyclopentadienyl groups may be hydrogenated. In general formula (II), Y is a divalent hydrocarbon group having 1 to 20 carbon atoms, a divalent halogenated hydrocarbon group having 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^a$—, —P(R$^a$)—, —P(O)(R$^a$)—, —BR$^a$—, or —AlR$^a$— (where R$^a$ may be the same as or different from each other and is a hydrocarbon group having 1 to 20 carbon atoms, a halogenated hydrocarbon group having 1 to 20 carbon atoms, a hydrogen atom, a halogen atom, or a nitrogen compound residue having one or two hydrocarbon groups having 1 to 20 carbon atoms on a nitrogen atom).)

Of the above propylene polymerization catalysts, the method for producing the above propylene homopolymer for capacitors preferably uses the metallocene catalyst. The method for production using the metallocene catalyst is desirable because it can easily yield a propylene homopolymer having a high meso pentad fraction and containing little CXS component, which is presumably harmful for the insulation properties.

The polymerization catalyst preferably used in the present invention is preferably a metallocene catalyst containing a bridged metallocene compound represented by general formula (III) below, which has already been internationally published (WO01/27124) by the applicant; at least one compound selected from organometallic compounds, organoaluminum oxy compounds, and compounds capable of forming an ion pair by reacting with a metallocene compound; and optionally a particulate support.

[Chem. 2]

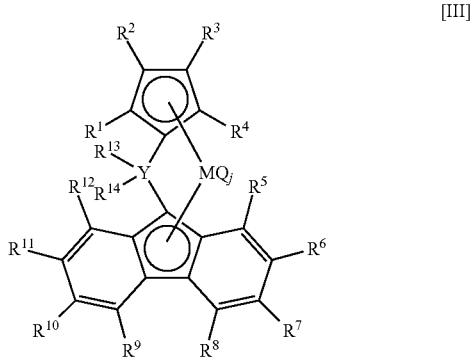

[III]

In general formula (III) above, $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ are selected from a hydrogen atom, a hydrocarbon group, and a silicon-containing group and may each be the same or different. Examples of hydrocarbon groups include linear hydrocarbon groups such as methyl, ethyl, n-propyl, allyl, n-butyl, n-pentyl, n-hexyl, n-heptyl, n-octyl, n-nonyl, and n-decanyl groups; branched hydrocarbon groups such as isopropyl, tert-butyl, amyl, 3-methylpentyl, 1,1-diethylpropyl, 1,1-dimethylbutyl, 1-methyl-1-propylbutyl, 1,1-propylbutyl, 1,1-dimethyl-2-methylpropyl, and 1-methyl-1-isopropyl-2-methylpropyl groups; saturated cyclic hydrocarbon groups such as cyclopentyl, cyclohexyl, cycloheptyl, cyclooctyl, norbornyl, and adamantyl groups; unsaturated cyclic hydrocarbon groups such as phenyl, tolyl, naphthyl, biphenyl, phenanthryl, and anthracenyl; saturated hydrocarbon groups substituted with unsaturated cyclic hydrocarbon groups, such as benzyl, cumyl, 1,1-diphenylethyl, and triphenylmethyl groups; and heteroatom-containing hydrocarbon groups such as methoxy, ethoxy, phenoxy, furyl, N-methylamino, N,N-dimethylamino, N-phenylamino, pyrryl, and thienyl groups. Examples of silicon-containing groups include trimethylsilyl, triethylsilyl, dimethylphenylsilyl, diphenylmethylsilyl, and triphenylsilyl. In addition, the adjacent substituents of $R^5$ to $R^{12}$ may combine with each other to form a ring. Examples of such substituted fluorenyl groups include benzofluorenyl, dibenzofluorenyl, octahydrodibenzofluorenyl, octamethyloctahydrodibenzofluorenyl, and octamethyltetrahydrodicyclopentafluorenyl groups.

For the metallocene compound used in the present invention, $R^1$, $R^2$, $R^3$, and $R^4$, which are substituents on the cyclopentadienyl ring in general formula (III), are preferably a hydrogen atom or a hydrocarbon group having 1 to 20 carbon atoms. More preferably, $R^2$ and $R^4$ are hydrocarbon groups having 1 to 20 carbon atoms. Particularly preferably, $R^1$ and $R^3$ are hydrogen atoms, and $R^2$ and $R^4$ are linear or branched alkyl groups having 1 to 5 carbon atoms.

In general formula (III), additionally, $R^5$ to $R^{12}$, which are substituents on the fluorene ring, are preferably a hydrogen atom or a hydrocarbon group having 1 to 20 carbon atoms. Examples of hydrocarbon groups having 1 to 20 carbon atoms include those described above. The adjacent substituents of $R^5$ to $R^{12}$ may combine with each other to form a ring. A preferable fluorene ring is one in which $R^7$ and $R^{11}$ are not simultaneously a hydrogen atom, and a more preferable fluorene ring is one in which $R^6$, $R^7$, $R^{10}$, and $R^{11}$ are not simultaneously a hydrogen atom.

For the metallocene catalyst used in the present invention, in general formula (III), Y, which bridges the cyclopentadienyl ring with the fluorenyl ring, is preferably a group 14 element, more preferably carbon, silicon, or germanium, still more preferably a carbon atom.

In addition, $R^{13}$ and $R^{14}$, which are substituents on Y, may be the same as or different from each other and are hydrocarbon groups having 1 to 20 carbon atoms that may combine with each other to form a ring, more preferably, selected from alkyl groups having 1 to 3 carbon atoms and aryl groups having 6 to 20 carbon atoms. As such substituents, for example, methyl, ethyl, phenyl, and tolyl groups are preferred. $R^{13}$ and $R^{14}$ may combine with the adjacent substituents of $R^5$ to $R^{12}$ or the adjacent substituents of $R^1$ to $R^4$ to form a ring.

In general formula (III), M is preferably a group 4 transition metal, more preferably a titanium, zirconium, or hafnium atom. In addition, Q is selected from a halogen, a hydrocarbon group, an anionic ligand, and a neutral ligand that can coordinate with a lone pair of electrons in a combination of the same type or different types. j is an integer of 1 to 4, where if j is 2 or more, Q may be the same as or different from each other. Specific examples of halogens include fluorine, chlorine, bromine, and iodine atoms, and specific examples of hydrocarbon groups include ones similar to those described above. Specific examples of anionic ligands include alkoxy groups such as methoxy, tert-butoxy, and phenoxy; carboxylate groups such as acetate and benzoate; and sulfonate groups such as mesylate and tosylate. Specific examples of neutral ligands that can coordinate with a lone pair of electrons include organophosphorous compounds such as trimethylphosphine, triethylphosphine, triphenylphosphine, and diphenylmethylphosphine and ethers such as tetrahydrofuran, diethyl ether, dioxane, and 1,2-dimethoxyethane. Preferably, at least one Q is a halogen or an alkyl group.

Examples of preferred bridged metallocene compounds include dimethylmethylene(3-tert-butyl-5-methylcyclopentadienyl)(3,6-ditert-butylfluorenyl)zirconium dichloride, 1-phenylethylidene(4-tert-butyl-2-methylcyclopentadienyl) (octamethyloctahydrodibenzofluorenyl)zirconium dichloride, [3-(1',1',4',4',7',7',10',10'-octamethyloctahydrodibenzo [b,h]fluorenyl)(1,1,3-trimethyl-5-tert-butyl-1,2,3,3a-tetrahydropentalene)]zirconium dichloride, and dimethylmethylene(3-tert-butyl-5-methylcyclopentadienyl) (1,1,4,4,7,7,10,10-octamethyloctahydrodibenzo[b,h]fluorenyl)zirconium dichloride.

For the metallocene catalyst used in the present invention, as at least one compound (cocatalyst) selected from organometallic compounds, organoaluminum oxy compounds, and compounds that form an ion pair by reacting with a metallocene compound and an optionally used particulate support, those disclosed in the above publication (WO01/27124) by the applicant and in Japanese Unexamined Patent Application Publication No. 11-315109 can be used together with the metallocene compound represented by general formula (III) without limitation.

An example of a method for implementing control such that the propylene homopolymer simultaneously satisfies the above requirements (i) to (v) and (ix), preferably further satisfies the above requirement (vi), more preferably further satisfies the above requirement (iii)', still more preferably further satisfies the above requirement (vii), and particularly preferably further satisfies the above requirement (viii) is to set appropriate polymerization conditions, including polymerization temperature, using the catalyst as described above. One specific example is a method in which the type of catalyst is dimethylmethylene(3-t-butyl-5-methylcyclopentadienyl)(3,6-di-t-butylfluorenyl)zirconium dichloride, the polymerization temperature is set to 50° C. to 90° C., preferably 60° C. to 80° C., and hydrogen is supplied together with the raw materials such that the amount of hydrogen supplied is 0.03 to 0.3 mole percent, preferably 0.06 to 0.21 mole percent, still more preferably 0.07 to 0.18 mole percent.

In the examples herein, described later, the propylene homopolymers of the present invention were produced by performing prepolymerization in the presence of a metallocene compound of general formula (III) where $R^1$ and $R^3$ are hydrogen atoms, $R^2$ is a tert-butyl group, $R^4$ is a methyl group, $R^7$ and $R^{10}$ are tert-butyl groups, $R^5$, $R^6$, $R^8$, $R^9$, $R^{11}$, and $R^{12}$ are hydrogen atoms, Y is a carbon atom, $R^{13}$ and $R^{14}$ are methyl groups, M is a zirconium atom, Q is a chlorine atom, and j is 2, namely, dimethylmethylene(3-tert-butyl-5-methylcyclopentadienyl)(3,6-ditert-butylfluorenyl)zirconium dichloride, [3-(1',1',4',4',7',7',10',10'-octamethyloctahydrodibenzo[b,h]fluorenyl)(1,1,3-trimethyl-5-tert-butyl-1,2,3,3a-tetrahydropentalene)]zirconium dichloride or dimethylmethylene(3-tert-butyl-5-methylcyclopentadienyl)(1,1,4,4,7,7,10,10-octamethyloctahydrodibenzo[b,h]fluorenyl)zirconium dichloride, a cocatalyst, namely, a solid catalyst having methylaluminoxane supported on silica support, and triethylaluminum, and then performing main polymerization in multiple steps, although the present invention is not limited to those conditions.

Stretched Film for Capacitors

The stretched film of the present invention for capacitors is a film formed by stretching the propylene homopolymer at an area stretching ratio (area ratio obtained by length×width) of 30 to 80 times, preferably 35 to 75 times, more preferably 40 to 70 times. A higher stretching ratio allows the propylene homopolymer to be highly crystallized, thus yielding a stretched film having higher dielectric breakdown strength.

The stretched film of the present invention for capacitors has high withstand voltage. The withstand voltage is preferably 650 V/μm or more, more preferably 660 V/μm or more, particularly preferably 670 V/μm or more, for a stretched film having a thickness of about 14 μm. Here, the withstand voltage is a value obtained by the measurement method used in the examples described later.

A common stretched film for capacitors tends to have a lower withstand voltage with increasing operating temperature; the stretched film of the present invention for capacitors is characterized in that it can maintain high withstand voltage at elevated operating temperatures because it uses a propylene homopolymer having high tacticity and high molecular weight.

The stretched film of the present invention for capacitors typically has a thickness of 1 to 50 μm, preferably 1.5 to 30 μm. In particular, the stretched film of the present invention for capacitors is expected to provide a particularly significant effect if it is a thin film having a thickness of 15 μm or less because it uses a propylene homopolymer having high tacticity and high molecular weight.

The stretched film of the present invention for capacitors can be produced by a known method for producing a biaxial stretched film such as simultaneous biaxial stretching or sequential biaxial stretching. The conditions for biaxial stretching may be those for production of known OPP films or capacitor films; in sequential biaxial stretching, for example, the longitudinal stretching temperature may be 125° C. to 145° C. with a draw ratio of 4.5 to 9 times, and the transverse stretching temperature may be 150° C. to 190° C. with a draw ratio of 7 to 11 times. If blocking occurs between films, it is desirable to control the chill roll temperature to 70° C. to 110° C. to appropriately roughen the surfaces thereof.

One method will be described as a specific example of the method for producing the stretched film for capacitors, although the present invention is not limited thereto.

First, a 30 mm diameter T-die is used to form a sheet having a thickness of 100 to 1,200 μm at a die temperature of 200° C. to 250° C. and a chill roll temperature of 70° C. to 90° C. The resulting sheet is preheated at 154° C. to 158° C. for one minute and is stretched at 154° C. to 158° C. and a stretching speed of 6 m/s by 5 to 9 times in the longitudinal direction and 7 to 9 times in the transverse direction to yield a stretched film having a thickness of 3 to 15 μm.

EXAMPLES

The present invention will now be more specifically described with reference to the examples, although the present invention is not limited thereto. The properties of the propylene homopolymers used in the examples and comparative examples were measured as follows.

(1) Melt Flow Rate (MFR)

The melt flow rate (MFR) of the propylene homopolymers was measured at 230° C. under a load of 2.16 kg according to ASTM D1238.

(2) Meso Pentad Fraction (mmmm)

The meso pentad fraction (mmmm) of the propylene homopolymers, which is a value defined by the assignment shown by A. Zambelli et al. in Macromolecules, 8,687 (1975), was determined by meso pentad fraction=(peak area at 21.7 ppm)/(peak area from 19 to 23 ppm) from the measurements obtained by $^{13}$C-NMR under the following conditions.

Measurement Conditions
 Type: JNM-Lambda 400 (manufactured by JEOL Ltd.)
 Resolution: 400 MHz
 Measurement temperature: 125° C.
 Solvent: 1,2,4-trichlorobenzene/deuterated benzene=7/4
 Pulse width: 7.8 μsec
 Pulse interval: 5 sec
 Number of acquisitions: 2,000
 Shift standard: TMS=0 ppm
 Mode: single-pulse broadband decoupling (3) Integrated Amount of Elution Measured up to 100° C. by CFC During Heating and Peak Half-Width and Peak Top Temperature Measured by CFC The integrated amount of elution of the propylene homopolymers was measured using the model CFC T-150A manufactured by Mitsubishi Petrochemical Co., Ltd. as follows.

The separation columns were Shodex AT-806MS (three columns), the eluent was o-dichlorobenzene, the sample concentration was 0.15 to 0.3 wt/vol %, the amount of sample injected was 0.5 mL, and the flow rate was 1.0 mL/min. The samples were heated at 135° C. for two hours and were cooled to 0° C. at 1° C./min. The samples were then held at 0° C. for 60 minutes for coating. The void volume of temperature-rising elution column was 0.86 mL, and the pipe volume was 0.06 mL.

A detector was a Foxboro infrared spectrometer MIRAN 1A CVF (CaF2 cell). Infrared light of 3.42 μm (2924 cm-1) was measured in an absorbance mode at a response time of 10 seconds. The elution temperature range between 0° C. and 135° C. was divided into 25 to 35 fractions. In particular, the elution temperature range in the vicinity of the elution peak emerged was divided into 2° C.-interval fraction. All the temperatures were expressed by an integer. For example, the elution fraction at 120° C. refers to components eluted in the range of 118° C. to 120° C. The integrated amount of elution at 90° C. by CFC is the total amount of elution fraction in the range of 0° C. to 90° C. The integrated amount of elution at 100° C. by CFC is the total amount of elution fraction in the range of 0° C. to 100° C. The molecular weights of the component that formed no coating even at 0° C. and the fractions eluted at the individual temperatures were measured, and the PP-equivalent molecular weights thereof were calculated using a universal calibration curve. The SEC temperature was 135° C., the amount of internal standard injected was 0.5 mL, the injection position was 3.0 mL, and the data sampling time was 0.50 second.

The sample concentration can be set to less than 0.15 wt/vol % if an abnormal pressure occurs because of an excessive amount of component eluted in a narrow temperature range. The data processing was performed using the analysis program "CFC Data Processing (version 1.50)" supplied with the apparatus. The cross fractionation (CFC) itself is considered to be an analytical method that reproduces results with high analytical precision if exactly identical measurement conditions are set; in the examples in the present invention, values obtained by carrying out the measurement once are shown.

The peak half-width was defined and determined as the width between the elution temperatures at which the amount of eluted component was half the maximum amount of eluted component, and the peak top temperature was defined and determined as the temperature at which the amount of eluted component was maximized.

(4) Melting Point (Tm)

The melting point (Tm) of the propylene homopolymers was measured using a differential scanning calorimeter (DSC; manufactured by PerkinElmer Inc.) as follows. The endothermic peak measured in the third step was defined as the melting point (Tm).

Measurement Conditions

Sample preparation conditions: the samples were pressed at 230° C. for two minutes and were cooled on a heatsink for one minute to form sample sheets having a thickness of 0.1 to 0.4 mm.

About 5 mg of hot-pressed sample was put in a perforated aluminum sample pan having an internal volume of 30 μL and was subjected to measurement with the pan closed with an aluminum lid.

First step: the sample was heated to 230° C. at 500° C./min and was held for ten minutes.

Second step: the sample was cooled to 30° C. at 10° C./min and was held for one minute.

Third step: the sample was heated to 230° C. at 10° C./min.

(5) Chlorine Content (Cl)

The chlorine content of the propylene homopolymers was measured as follows.

A burner manufactured by Mitsubishi Kasei Corporation was used to burn 0.8 g of a sample at 400° C. to 900° C. in an argon/oxygen flow, the combustion gas was captured with ultrapure water, and the sample solution was concentrated and subjected to measurement using the DIONEX-DX300 ion chromatography system manufactured by Nippon Dionex K.K. and the AS4A-SC anion column (manufactured by Dionex K.K.).

(6) Proportions of Irregularly Bonded Units Due to 2,1-Insertion and 1,3-Insertion The proportion of 2,1-insertion of propylene monomer and the proportion of 1,3-insertion of propylene monomer in all propylene constituent units were measured by $^{13}$C-NMR according to the method disclosed in Japanese Unexamined Patent Application Publication No. 7-145212.

(7) Boiling n-Heptane Insoluble Fraction Content (HI)

The HI of the propylene homopolymers was measured as follows.

As the method for determining the HI, first, 1 g of a sample was put in a Soxhlet extractor and was subjected to extraction in boiling n-heptane for ten hours. The sample was then cleaned with acetone, was dried at 120° C. for six hours, and was weighed, and the percent weight based on the initial amount of sample was calculated.

(8) Xylene Soluble Fraction Content (CXS)

The CXS of the propylene homopolymers was calculated as follows.

Weighed out was 5 g of a sample propylene homopolymer, which was completely dissolved in 500 mL of boiling xylene and was allowed to stand until the solution temperature reached 20° C. After the solution temperature reached 20° C., it was further allowed to stand for 30 minutes and was filtrated to remove precipitate. The filtrate was concentrated and dried to solid and was further dried at 60° C. and 160 mmHg for six hours, and the residue was weighed. The weight fraction of the component dissolved in xylene in the sample used was calculated as the CSX.

(9) Withstand Voltage (BDV)

The BDV of the resulting stretched films was measured at 80° C. according to JIS-C2330.

Example 1

Production of Propylene Homopolymer (PP1)

(1) Production of Solid Catalyst Support

Sampled into a 1 L side-arm flask was 300 g of $SiO_2$ (SUNSPHERE H121 manufactured by AGC Si-Tech Co., Ltd.), which was slurried by adding 800 mL of toluene. The slurry was then transferred into a 5 L four-necked flask, and 260 mL of toluene was added. Further introduced was 2,830 mL of a methylaluminoxane (hereinafter MAO)-toluene solution (10 wt % solution). The mixture was stirred at room temperature for 30 minutes. The mixture was heated to 110° C. in one hour and was reacted for four hours. Upon completion of the reaction, the mixture was cooled to room temperature. After the cooling, supernatant toluene was removed, and replacement with fresh toluene was performed to a replacement rate of 95%.

(2) Production of Solid Catalyst (Supporting of Metal Catalyst Component onto Support)

Weighed out in a 5 L four-necked flask in a glove box was 1.0 g of dimethylmethylene(3-t-butyl-5-methylcyclopentadienyl)(3,6-di-t-butylfluorenyl)zirconium dichloride. The flask was taken out, 0.5 L of toluene and 2.0 L (100 g as the solid component) of the $MAO/SiO_2$/toluene slurry prepared in (1) above were added under nitrogen, and the mixture was stirred for 30 minutes for supporting. The resulting dimethylmethylene(3-t-butyl-5-methylcyclopentadienyl)(3,6-di-t-butylfluorenyl)zirconium dichloride/$MAO/SiO_2$/toluene slurry was subjected to 99% replacement with n-heptane such that the final amount of slurry was 4.5 L. This procedure was carried out at room temperature.

(3) Production of Prepolymerized Catalyst

An autoclave having an internal volume of 200 L and equipped with a stirrer was charged with 101 g of the solid catalyst component prepared in (2) above, 111 mL of triethylaluminum, and 80 L of heptane and was further charged with 303 g of ethylene while maintaining the internal temperature at 15° C. to 20° C., and they were reacted with stirring for 180 minutes. Upon completion of the polymerization, a solid component was allowed to precipitate, and removing supernatant liquid and cleaning with heptane was carried out twice. The resulting prepolymerized catalyst was resuspended in purified heptane and was adjusted with heptane to the solid catalyst component concentration of 1 g/L. This prepolymerized catalyst contained 3 g of polyethylene per gram of the solid catalyst component.

(4) Main Polymerization

Polymerization was performed by continuously supplying a jacketed circulation tubular polymerization reactor having an internal volume of 58 L with propylene at 30 kg/h, hydrogen at 5 NL/h, the catalyst slurry produced in (3) above at 3.2 g/h as the solid catalyst component, and triethylaluminum at 1.0 mL/h so as to keep it full without any vapor phase. The temperature of the tubular polymerization reactor was 30° C., and the pressure thereof was 3.1 MPa/G.

The resulting slurry was transferred into a vessel polymerization reactor having an internal volume of 1,000 L and equipped with a stirrer for further polymerization. The polymerization reactor was supplied with propylene at 50 kg/h and with hydrogen such that the vapor phase had a hydrogen concentration of 0.12 mole percent. Polymerization was performed at a polymerization temperature of 70° C. and a pressure of 3.0 MPa/G.

The resulting slurry was transferred into a vessel polymerization reactor having an internal volume of 500 L and equipped with a stirrer for further polymerization. The polymerization reactor was supplied with propylene at 15 kg/h and with hydrogen such that the vapor phase had a hydrogen concentration of 0.12 mole percent. Polymerization was performed at a polymerization temperature of 69° C. and a pressure of 2.9 MPa/G.

The resulting slurry was transferred into a vessel polymerization reactor having an internal volume of 500 L and equipped with a stirrer for further polymerization. The polymerization reactor was supplied with propylene at 12 kg/h and with hydrogen such that the vapor phase had a hydrogen concentration of 0.12 mole percent. Polymerization was performed at a polymerization temperature of 68° C. and a pressure of 2.9 MPa/G.

The resulting slurry was transferred into a vessel polymerization reactor having an internal volume of 500 L and equipped with a stirrer for further polymerization. The polymerization reactor was supplied with propylene at 13 kg/h and with hydrogen such that the vapor phase had a hydrogen concentration of 0.12 mole percent. Polymerization was performed at a polymerization temperature of 67° C. and a pressure of 2.9 MPa/G.

The resulting slurry was subjected to vaporization and was subjected to gas-solid separation to yield a propylene homopolymer (PP1). The propylene homopolymer (PP1) was yielded at 40 kg/h. The propylene homopolymer (PP1) was dried in a vacuum at 80° C.

The properties of the propylene homopolymer (PP1) thus yielded are shown in Table 1 below.

Pelletizing

The propylene homopolymer (PP1) was pelletized by blending 100 parts by weight of the resulting propylene homopolymer (PP1) with 0.2 part by weight of 3,5-di-tert-butyl-4-hydroxytoluene, as an antioxidant, 0.2 part by weight of tetrakis[methylene-3(3,5-di-tert-butyl-4-hydroxyphenyl)propionate]methane, as an antioxidant, and 0.01 part by weight of calcium stearate, as a neutralizer, and melt-kneading the blend at a resin temperature of 230° C. using a single-screw extruder. The pelletizer used was GMZ50-32 (L/D=32, 50 mm diameter single screw) manufactured by GM Engineering Co., Ltd.

Sheet Molding

The pellets of the propylene homopolymer (PP1) formed as above were melted at 250° C. and extruded through a 30 mm diameter T-die manufactured by GM Engineering Co., Ltd., and the melt was cooled on a cooling roller held at a temperature of 30° C. at a take-off speed of 1.0 m/min to form a sheet having a thickness of 0.5 mm.

Formation of Stretched Film

The sheet formed as above was cut to 85 mm×85 mm and was biaxially stretched to form a biaxially stretched film having a thickness of 14 μm under the following conditions. The withstand voltage of the resulting stretched film was measured by the method described above. The results are shown in Table 1.

Stretcher: Bruckner KARO IV
Preheat temperature: 154° C.
Preheat time: 60 seconds
Stretching ratio: sequential biaxial stretching by 5×7 times (5 times in MD and 7 times in TD)
Stretching rate: 6 m/min

Example 2

Polymerization was performed as follows, and a stretched film was formed in the same manner as in Example 1 except that the resulting propylene homopolymer (PP2) was used. The withstand voltage of the resulting stretched film was measured by the method described above. The results are shown in Table 1.

Production of Propylene Homopolymer (PP2)

(1) Production of Solid Catalyst Support

Sampled into a 1 L side-arm flask was 300 g of $SiO_2$ (SUNSPHERE H121 manufactured by AGC Si-Tech Co., Ltd.), which was slurried by adding 800 mL of toluene. The slurry was then transferred into a 5 L four-necked flask, and 260 mL of toluene was added. Further introduced was 2,830 mL of a methylaluminoxane (hereinafter MAO)-toluene solution (10 wt % solution). The mixture was stirred at room temperature for 30 minutes. The mixture was heated to 110° C. in one hour and was reacted for four hours. Upon completion of the reaction, the mixture was cooled to room temperature. After the cooling, supernatant toluene was removed, and replacement with fresh toluene was performed to a replacement rate of 95%.

(2) Production of Solid Catalyst (Supporting of Metal Catalyst Component onto Support)

Weighed out in a 5 L four-necked flask in a glove box was 1.0 g of [3-(1',1',4',4',7',7',10',10'-octamethyloctahydrodibenzo[b,h]fluorenyl)(1,1,3-trimethyl-5-tert-butyl-1,2,3,3a-tetrahydropentalene)]zirconium dichloride. The flask was taken out, 0.5 L of toluene and 2.0 L (100 g as the solid component) of the $MAO/SiO_2$/toluene slurry prepared in (1) above were added under nitrogen, and the mixture was stirred for 30 minutes for supporting. The resulting [3-(1',1',4',4',7',7',10',10'-octamethyloctahydrodibenzo[b,h]fluorenyl)(1,1,3-trimethyl-5-tert-butyl-1,2,3,3a-tetrahydropentalene)]zirconium dichloride/$MAO/SiO_2$/toluene slurry was subjected to 99% replacement with n-heptane such that the final amount of slurry was 4.5 L. This procedure was carried out at room temperature.

(3) Production of Prepolymerized Catalyst

An autoclave having an internal volume of 200 L and equipped with a stirrer was charged with 101 g of the solid catalyst component prepared in (2) above, 111 mL of triethylaluminum, and 80 L of heptane and was further charged with 303 g of ethylene while maintaining the internal temperature at 15° C. to 20° C., and they were reacted with stirring for 180 minutes. Upon completion of the polymerization, a solid component was allowed to precipitate, and removing supernatant liquid and cleaning with heptane was carried out twice. The resulting prepolymerized catalyst was resuspended in purified heptane and was adjusted with heptane to the solid catalyst component concentration of 1 g/L. This prepolymerized catalyst contained 3 g of polyethylene per gram of the solid catalyst component.

(4) Main Polymerization

Polymerization was performed by continuously supplying a jacketed circulation tubular polymerization reactor having an internal volume of 58 L with propylene at 30 kg/h, hydrogen at 5 NL/h, the catalyst slurry produced in (3) above at 3.2 g/h as the solid catalyst component, and triethylaluminum at 1.0 mL/h so as to keep it full without any vapor phase. The temperature of the tubular polymerization reactor was 30° C., and the pressure thereof was 3.1 MPa/G.

The resulting slurry was transferred into a vessel polymerization reactor having an internal volume of 1,000 L and equipped with a stirrer for further polymerization. The polymerization reactor was supplied with propylene at 50 kg/h and with hydrogen such that the vapor phase had a hydrogen concentration of 0.10 mole percent. Polymerization was performed at a polymerization temperature of 70° C. and a pressure of 3.0 MPa/G.

The resulting slurry was transferred into a vessel polymerization reactor having an internal volume of 500 L and equipped with a stirrer for further polymerization. The polymerization reactor was supplied with propylene at 15 kg/h and with hydrogen such that the vapor phase had a hydrogen concentration of 0.10 mole percent. Polymerization was performed at a polymerization temperature of 69° C. and a pressure of 2.9 MPa/G.

The resulting slurry was transferred into a vessel polymerization reactor having an internal volume of 500 L and equipped with a stirrer for further polymerization. The polymerization reactor was supplied with propylene at 12 kg/h and with hydrogen such that the vapor phase had a hydrogen concentration of 0.10 mole percent. Polymerization was performed at a polymerization temperature of 68° C. and a pressure of 2.9 MPa/G.

The resulting slurry was transferred into a vessel polymerization reactor having an internal volume of 500 L and equipped with a stirrer for further polymerization. The polymerization reactor was supplied with propylene at 13 kg/h and with hydrogen such that the vapor phase had a hydrogen concentration of 0.10 mole percent. Polymerization was performed at a polymerization temperature of 67° C. and a pressure of 2.9 MPa/G.

The resulting slurry was subjected to vaporization and was subjected to gas-solid separation to yield a propylene homopolymer (PP2). The propylene homopolymer (PP2) was yielded at 40 kg/h. The propylene homopolymer (PP2) was dried in a vacuum at 80° C.

The properties of the propylene homopolymer (PP2) thus yielded are shown in Table 1 below.

Example 3

Polymerization was performed as follows, and a stretched film was formed in the same manner as in Example 1 except that the resulting propylene homopolymer (PP3) was used. The withstand voltage of the resulting stretched film was measured by the method described above. The results are shown in Table 1.

Production of Propylene Homopolymer (PP3)

(1) Production of Solid Catalyst Support

Sampled into a 1 L side-arm flask was 300 g of $SiO_2$ (SUNSPHERE H121 manufactured by AGC Si-Tech Co., Ltd.), which was slurried by adding 800 mL of toluene. The slurry was then transferred into a 5 L four-necked flask, and 260 mL of toluene was added. Further introduced was 2,830 mL of a methylaluminoxane (hereinafter MAO)-toluene solution (10 wt % solution). The mixture was stirred at room temperature for 30 minutes. The mixture was heated to 110° C. in one hour and was reacted for four hours. Upon completion of the reaction, the mixture was cooled to room temperature. After the cooling, supernatant toluene was removed, and replacement with fresh toluene was performed to a replacement rate of 95%.

(2) Production of Solid Catalyst (Supporting of Metal Catalyst Component onto Support)

Weighed out in a 5 L four-necked flask in a glove box was 1.0 g of dimethylmethylene(3-tert-butyl-5-methylcyclopentadienyl)(1,1,4,4,7,7,10,10-octamethyloctahydrodibenzo[b,h]fluorenyl)zirconium dichloride. The flask was taken out, 0.5 L of toluene and 2.0 L (100 g as the solid component) of the $MAO/SiO_2$/toluene slurry prepared in (1) above were added under nitrogen, and the mixture was stirred for 30 minutes for supporting. The resulting dimethylmethylene(3-tert-butyl-5-methylcyclopentadienyl)(1,1,4,4,7,7,10,10-octamethyloctahydrodibenzo[b,h]fluorenyl)zirconium dichloride/$MAO/SiO_2$/toluene slurry was subjected to 99% replacement with n-heptane such that the final amount of slurry was 4.5 L. This procedure was carried out at room temperature.

(3) Production of Prepolymerized Catalyst

An autoclave having an internal volume of 200 L and equipped with a stirrer was charged with 101 g of the solid catalyst component prepared in (2) above, 111 mL of triethylaluminum, and 80 L of heptane and was further charged with 303 g of ethylene while maintaining the internal temperature at 15° C. to 20° C., and they were reacted with stirring for 180 minutes. Upon completion of the polymerization, a solid component was allowed to precipitate, and removing supernatant liquid and cleaning with heptane was carried out twice. The resulting prepolymerized catalyst was resuspended in purified heptane and was adjusted with heptane to the solid catalyst component concentration of 1 g/L. This prepolymerized catalyst contained 3 g of polyethylene per gram of the solid catalyst component.

(4) Main Polymerization

Polymerization was performed by continuously supplying a jacketed circulation tubular polymerization reactor having an internal volume of 58 L with propylene at 30 kg/h, hydrogen at 5 NL/h, the catalyst slurry produced in (3) above at 3.2 g/h as the solid catalyst component, and triethylaluminum at 1.0 mL/h so as to keep it full without any vapor phase. The temperature of the tubular polymerization reactor was 30° C., and the pressure thereof was 3.1 MPa/G.

The resulting slurry was transferred into a vessel polymerization reactor having an internal volume of 1,000 L and equipped with a stirrer for further polymerization. The polymerization reactor was supplied with propylene at 50 kg/h and with hydrogen such that the vapor phase had a hydrogen concentration of 0.12 mole percent. Polymerization was performed at a polymerization temperature of 70° C. and a pressure of 3.0 MPa/G.

The resulting slurry was transferred into a vessel polymerization reactor having an internal volume of 500 L and equipped with a stirrer for further polymerization. The polymerization reactor was supplied with propylene at 15 kg/h and with hydrogen such that the vapor phase had a hydrogen concentration of 0.12 mole percent. Polymerization was performed at a polymerization temperature of 69° C. and a pressure of 2.9 MPa/G.

The resulting slurry was transferred into a vessel polymerization reactor having an internal volume of 500 L and equipped with a stirrer for further polymerization. The polymerization reactor was supplied with propylene at 12 kg/h and with hydrogen such that the vapor phase had a hydrogen concentration of 0.12 mole percent. Polymerization was performed at a polymerization temperature of 68° C. and a pressure of 2.9 MPa/G.

The resulting slurry was transferred into a vessel polymerization reactor having an internal volume of 500 L and equipped with a stirrer for further polymerization. The polymerization reactor was supplied with propylene at 13 kg/h and with hydrogen such that the vapor phase had a hydrogen concentration of 0.12 mole percent. Polymerization was performed at a polymerization temperature of 67° C. and a pressure of 2.9 MPa/G.

The resulting slurry was subjected to vaporization and was subjected to gas-solid separation to yield a propylene homopolymer (PP3). The propylene homopolymer (PP3) was yielded at 40 kg/h. The propylene homopolymer (PP3) was dried in a vacuum at 80° C.

The properties of the propylene homopolymer (PP3) thus yielded are shown in Table 1 below.

Comparative Example 1

Polymerization was performed as follows, and a stretched film was formed in the same manner as in Example 1 except that the resulting propylene homopolymer (PP4) was used. The withstand voltage of the resulting stretched film was measured by the method described above. The results are shown in Table 1.
Production of Propylene Homopolymer (PP4)
(1) Production of Solid Catalyst Support Sampled into a 1 L side-arm flask was 300 g of $SiO_2$ (SUNSPHERE H121 manufactured by AGC Si-Tech Co., Ltd.), which was slurried by adding 800 mL of toluene. The slurry was then transferred into a 5 L four-necked flask, and 260 mL of toluene was added. Further introduced was 2,830 mL of a methylaluminoxane (hereinafter MAO)-toluene solution (10 wt. % solution). The mixture was stirred at room temperature for 30 minutes. The mixture was heated to 110° C. in one hour and was reacted for four hours. Upon completion of the reaction, the mixture was cooled to room temperature. After the cooling, supernatant toluene was removed, and replacement with fresh toluene was performed to a replacement rate of 95%.
(2) Production of Solid Catalyst (Supporting of Metal Catalyst Component onto Support)

Weighed out in a 5 L four-necked flask in a glove box was 1.0 g of diphenylmethylene(3-t-butyl-5-methylcyclopentadienyl)(2,7-t-butylfluorenyl)zirconium dichloride. The flask was taken out, 0.5 L of toluene and 2.0 L (100 g as the solid component) of the $MAO/SiO_2$/toluene slurry prepared in (1) above were added under nitrogen, and the mixture was stirred for 30 minutes for supporting. The resulting diphenylmethylene(3-t-butyl-5-methylcyclopentadienyl)(2,7-t-butylfluorenyl)zirconium dichloride/$MAO/SiO_2$/toluene slurry was subjected to 99% replacement with n-heptane such that the final amount of slurry was 4.5 L. This procedure was carried out at room temperature.
(3) Production of Prepolymerized Catalyst An autoclave having an internal volume of 200 L and equipped with a stirrer was charged with 101 g of the solid catalyst component prepared in (2) above, 111 mL of triethylaluminum, and 80 L of heptane and was further charged with 303 g of ethylene while maintaining the internal temperature at 15° C. to 20° C., and they were reacted with stirring for 180 minutes. Upon completion of the polymerization, a solid component was allowed to precipitate, and removing supernatant liquid and cleaning with heptane was carried out twice. The resulting prepolymerized catalyst was resuspended in purified heptane and was adjusted with heptane to the solid catalyst component concentration of 1 g/L. This prepolymerized catalyst contained 3 g of polyethylene per gram of the solid catalyst component.
(4) Main Polymerization Polymerization was performed by continuously supplying a jacketed circulation tubular polymerization reactor having an internal volume of 58 L with propylene at 30 kg/h, hydrogen at 5 NL/h, the catalyst slurry produced in (3) above at 4.4 g/h as the solid catalyst component, and triethylaluminum at 1.0 mL/h so as to keep it full without any vapor phase. The temperature of the tubular polymerization reactor was 30° C., and the pressure thereof was 3.1 MPa/G.

The resulting slurry was transferred into a vessel polymerization reactor having an internal volume of 1,000 L and equipped with a stirrer for further polymerization. The polymerization reactor was supplied with propylene at 50 kg/h and with hydrogen such that the vapor phase had a hydrogen concentration of 0.06 mole percent. Polymerization was performed at a polymerization temperature of 70° C. and a pressure of 3.0 MPa/G.

The resulting slurry was transferred into a vessel polymerization reactor having an internal volume of 500 L and equipped with a stirrer for further polymerization. The polymerization reactor was supplied with propylene at 15 kg/h and with hydrogen such that the vapor phase had a hydrogen concentration of 0.06 mole percent. Polymerization was performed at a polymerization temperature of 69° C. and a pressure of 2.9 MPa/G.

The resulting slurry was transferred into a vessel polymerization reactor having an internal volume of 500 L and equipped with a stirrer for further polymerization. The polymerization reactor was supplied with propylene at 12 kg/h and with hydrogen such that the vapor phase had a hydrogen concentration of 0.06 mole percent. Polymerization was performed at a polymerization temperature of 68° C. and a pressure of 2.9 MPa/G.

The resulting slurry was transferred into a vessel polymerization reactor having an internal volume of 500 L and equipped with a stirrer for further polymerization. The polymerization reactor was supplied with propylene at 13 kg/h and with hydrogen such that the vapor phase had a hydrogen concentration of 0.06 mole percent. Polymerization was performed at a polymerization temperature of 67° C. and a pressure of 2.9 MPa/G.

The resulting slurry was subjected to vaporization and was subjected to gas-solid separation to yield a propylene homopolymer (PP4). The propylene homopolymer (PP4) was yielded at 40 kg/h. The propylene homopolymer (PP4) was dried in a vacuum at 80° C.

The properties of the propylene homopolymer (PP4) thus yielded are shown in Table 1 below.

Comparative Example 2

Polymerization was performed as follows, and a stretched film was formed in the same manner as in Example 1 except that the resulting propylene homopolymer (PP5) was used. The withstand voltage of the resulting stretched film was measured by the method described above. The results are shown in Table 1.
Production of Propylene Homopolymer (PP5)
(1) Production of Solid Catalyst Support Sampled into a 1 L side-arm flask was 300 g of $SiO_2$ (SUNSPHERE H121 manufactured by AGC Si-Tech Co., Ltd.), which was slurried by adding 800 mL of toluene. The slurry was then transferred into a 5 L four-necked flask, and 260 mL of toluene was added. Further introduced was 2,830 mL of a methylaluminoxane (hereinafter MAO)-toluene solution (10 wt % solution). The mixture was stirred at room temperature for 30 minutes. The mixture was heated to 110° C. in one hour and was reacted for four hours. Upon completion of the reaction, the mixture was cooled to room temperature. After the cooling, supernatant toluene was removed, and replacement with fresh toluene was performed to a replacement rate of 95%.
(2) Production of Solid Catalyst (Supporting of Metal Catalyst Component onto Support)

Weighed out in a 5 L four-necked flask in a glove box was 1.0 g of dimethylsilylenebis-(2-methyl-4-phenylindenyl)zirconium dichloride. The flask was taken out, 0.5 L of toluene and 2.0 L (100 g as the solid component) of the $MAO/SiO_2/$toluene slurry prepared in (1) above were added under nitrogen, and the mixture was stirred for 30 minutes for supporting. The resulting dimethylsilylenebis-(2-methyl-4-phenylindenyl)zirconium dichloride/$MAO/SiO_2$/toluene slurry was subjected to 99% replacement with n-heptane such that the final amount of slurry was 4.5 L. This procedure was carried out at room temperature.
(3) Production of Prepolymerized Catalyst An autoclave having an internal volume of 200 L and equipped with a stirrer was charged with 101 g of the solid catalyst component prepared in (2) above, 111 mL of triethylaluminum, and 80 L of heptane and was further charged with 303 g of ethylene while maintaining the internal temperature at 15° C. to 20° C., and they were reacted with stirring for 180 minutes. Upon completion of the polymerization, a solid component was allowed to precipitate, and removing supernatant liquid and cleaning with heptane was carried out twice. The resulting prepolymerized catalyst was resuspended in purified heptane and was adjusted with heptane to the solid catalyst component concentration of 1 g/L. This prepolymerized catalyst contained 3 g of polyethylene per gram of the solid catalyst component.
(4) Main Polymerization Polymerization was performed by continuously supplying a jacketed circulation tubular polymerization reactor having an internal volume of 58 L with propylene at 30 kg/h, hydrogen at 5 NL/h, the catalyst slurry produced in (3) above at 1.7 g/h as the solid catalyst component, and triethylaluminum at 1.0 mL/h so as to keep it full without any vapor phase. The temperature of the tubular polymerization reactor was 30° C., and the pressure thereof was 3.1 MPa/G.

The resulting slurry was transferred into a vessel polymerization reactor having an internal volume of 1,000 L and equipped with a stirrer for further polymerization. The polymerization reactor was supplied with propylene at 50 kg/h and with hydrogen such that the vapor phase had a hydrogen concentration of 0.30 mole percent. Polymerization was performed at a polymerization temperature of 70° C. and a pressure of 3.0 MPa/G.

The resulting slurry was transferred into a vessel polymerization reactor having an internal volume of 500 L and equipped with a stirrer for further polymerization. The polymerization reactor was supplied with propylene at 15 kg/h and with hydrogen such that the vapor phase had a hydrogen concentration of 0.30 mole percent. Polymerization was performed at a polymerization temperature of 69° C. and a pressure of 2.9 MPa/G.

The resulting slurry was transferred into a vessel polymerization reactor having an internal volume of 500 L and equipped with a stirrer for further polymerization. The polymerization reactor was supplied with propylene at 12 kg/h and with hydrogen such that the vapor phase had a hydrogen concentration of 0.30 mole percent. Polymerization was performed at a polymerization temperature of 68° C. and a pressure of 2.9 MPa/G.

The resulting slurry was transferred into a vessel polymerization reactor having an internal volume of 500 L and equipped with a stirrer for further polymerization. The polymerization reactor was supplied with propylene at 13 kg/h and with hydrogen such that the vapor phase had a hydrogen concentration of 0.30 mole percent. Polymerization was performed at a polymerization temperature of 67° C. and a pressure of 2.9 MPa/G.

The resulting slurry was subjected to vaporization and was subjected to gas-solid separation to yield a propylene homopolymer (PP5). The propylene homopolymer (PP5) was yielded at 40 kg/h. The propylene homopolymer (PP5) was dried in a vacuum at 80° C.

The properties of the propylene homopolymer (PP5) thus yielded are shown in Table 1 below.

Comparative Example 3

Polymerization was performed as follows, and a stretched film was formed in the same manner as in Example 1 except that the resulting propylene homopolymer (PP6) was used. The withstand voltage of the resulting stretched film was measured by the method described above. The results are shown in Table 1.
Production of Propylene Homopolymer (PP6)
(1) Production of Solid Titanium Catalyst Component A homogeneous solution was prepared by heating 952 g of anhydrous magnesium chloride, 4,420 mL of decane, and 3,906 g of 2-ethylhexyl alcohol at 130° C. for two hours. This solution was mixed with 213 g of phthalic anhydride and was further stirred at 130° C. for one hour to dissolve the phthalic anhydride. The resulting homogeneous solution was cooled to 23° C., and 750 mL of the homogeneous solution was added dropwise to 2,000 mL of titanium tetrachloride held at −20° C. in one hour. After the dropwise addition, the resulting mixed solution was heated to 110° C. in four hours, was mixed with 52.2 g of diisobutyl phthalate (DIBP) upon reaching 110° C., and was heated at that temperature for two hours. A solid was then collected by hot filtration, was resuspended in 2,750 mL of titanium tetrachloride, and was heated again at 110° C. for two hours. Upon completion of the heating, a solid was collected again by hot filtration and was cleaned with decane and hexane at 110° C. until no titanium compound was detected in the cleaning solution. The solid titanium catalyst component thus prepared was stored as a hexane slurry. When a portion of the hexane slurry was dried and examined for catalyst composition, the solid titanium catalyst component contained 2% by weight of titanium, 57% by weight of chlorine, 21% by weight of magnesium, and 20% by weight of DIBP.

(2) Production of Prepolymerized Catalyst

An autoclave having an internal volume of 200 L and equipped with a stirrer was charged with 120 g of the solid titanium catalyst component prepared in (1) above, 20.5 mL of triethylaluminum, and 120 L of heptane and was charged with 720 g of propylene while maintaining the internal temperature at 5° C., and they were reacted with stirring for 60 minutes. Upon completion of the polymerization, a solid component was allowed to precipitate, and removing supernatant liquid and cleaning with heptane was carried out twice. The resulting prepolymerized catalyst was resuspended in purified heptane to yield a prepolymerized catalyst slurry having the solid titanium catalyst component concentration of 1 g/L. This prepolymerized catalyst contained 6 g of propylene homopolymer per gram of the solid titanium catalyst component.

(3) Main Polymerization

A vessel polymerization reactor having an internal volume of 100 L and equipped with a stirrer was continuously supplied with propylene at 110 kg/h, the prepolymerized catalyst slurry prepared in (2) above at 9.8 g/h, triethylaluminum at 5.8 mL/h, and dicyclopentyldimethoxysilane at 2.6 mL/h and was supplied with hydrogen such that the vapor phase had a hydrogen concentration of 0.9 mole percent. Polymerization was performed at a polymerization temperature of 73° C. and a pressure of 3.2 MPa/G. The resulting slurry was transferred into a vessel polymerization reactor having an internal volume of 1,000 L and equipped with a stirrer for further polymerization. The polymerization reactor was supplied with propylene at 30 kg/h and with hydrogen such that the vapor phase had a hydrogen concentration of 1.3 mole percent. Polymerization was performed at a polymerization temperature of 71° C. and a pressure of 3.0 MPa/G. The resulting slurry was transferred into a vessel polymerization reactor having an internal volume of 500 L and equipped with a stirrer for further polymerization. The polymerization reactor was supplied with propylene at 46 kg/h and with hydrogen such that the vapor phase had a hydrogen concentration of 1.3 mole percent. Polymerization was performed at a polymerization temperature of 69° C. and a pressure of 2.9 MPa/G. The resulting slurry was inactivated and was transferred to a cleaning bath containing liquid propylene to clean the propylene homopolymer powder. The resulting slurry was subjected to vaporization and was subjected to gas-solid separation to yield a propylene homopolymer. The resulting propylene homopolymer was introduced into a conical drier and was dried in a vacuum at 80° C. Then, 100 kg of the product was mixed with 35.9 g of pure water and 0.63 L of propylene oxide, was subjected to dechlorination treatment at 90° C. for two hours, and was dried in a vacuum at 80° C. to yield a propylene homopolymer (PP6).

The properties of the propylene homopolymer (PP6) thus yielded are shown in Table 1 below.

Comparative Example 4

Polymerization was performed as follows, and a stretched film was formed in the same manner as in Example 1 except that the resulting propylene homopolymer (PP7) was used. The withstand voltage of the resulting stretched film was measured by the method described above. The results are shown in Table 1.

Production of Propylene Homopolymer (PP7)

(1) Production of Solid Catalyst Support

Sampled into a 1 L side-arm flask was 300 g of $SiO_2$ (SUNSPHERE H121 manufactured by AGC Si-Tech Co., Ltd.), which was slurried by adding 800 mL of toluene. The slurry was then transferred into a 5 L four-necked flask, and 260 mL of toluene was added. Further introduced was 2,830 mL of a methylaluminoxane (hereinafter MAO)-toluene solution (10 wt % solution). The mixture was stirred at room temperature for 30 minutes. The mixture was heated to 110° C. in one hour and was reacted for four hours. Upon completion of the reaction, the mixture was cooled to room temperature. After the cooling, supernatant toluene was removed, and replacement with fresh toluene was performed to a replacement rate of 95%.

(2) Production of Solid Catalyst (Supporting of Metal Catalyst Component onto Support)

Weighed out in a 5 L four-necked flask in a glove box was 1.0 g of (phenyl)(methyl)methylene(3-t-butyl-5-methylcyclopentadienyl)(1,1,3,6,8,8-hexamethyl-1H,8H-dicyclopenta[b,h]fluorenyl)zirconium dichloride. The flask was taken out, 0.5 L of toluene and 2.0 L (100 g as the solid component) of the $MAO/SiO_2$/toluene slurry prepared in (1) above were added under nitrogen, and the mixture was stirred for 30 minutes for supporting. The resulting (phenyl)(methyl)methylene(3-t-butyl-5-methylcyclopentadienyl)(1,1,3,6,8,8-hexamethyl-1H,8H-dicyclopenta[b,h]fluorenyl)zirconium dichloride/$MAO/SiO_2$/toluene slurry was subjected to 99% replacement with n-heptane such that the final amount of slurry was 4.5 L. This procedure was carried out at room temperature.

(3) Production of Prepolymerized Catalyst

An autoclave having an internal volume of 200 L and equipped with a stirrer was charged with 101 g of the solid catalyst component prepared in (2) above, 111 mL of triethylaluminum, and 80 L of heptane and was further charged with 303 g of ethylene while maintaining the internal temperature at 15° C. to 20° C., and they were reacted with stirring for 180 minutes. Upon completion of the polymerization, a solid component was allowed to precipitate, and removing supernatant liquid and cleaning with heptane was carried out twice. The resulting prepolymerized catalyst was resuspended in purified heptane and was adjusted with heptane to the solid catalyst component concentration of 1 g/L. This prepolymerized catalyst contained 3 g of polyethylene per gram of the solid catalyst component.

(4) Main Polymerization

Polymerization was performed by continuously supplying a jacketed circulation tubular polymerization reactor having an internal volume of 58 L with propylene at 30 kg/h, hydrogen at 5 NL/h, the catalyst slurry produced in (3) above at 2.6 g/h as the solid catalyst component, and triethylaluminum at 1.0 mL/h so as to keep it full without any vapor phase. The temperature of the tubular polymerization reactor was 30° C., and the pressure thereof was 2.6 MPa/G.

The resulting slurry was transferred into a vessel polymerization reactor having an internal volume of 1,000 L and equipped with a stirrer for further polymerization. The polymerization reactor was supplied with propylene at 50 kg/h and with hydrogen such that the vapor phase had a hydrogen concentration of 0.19 mole percent. Polymerization was performed at a polymerization temperature of 60° C. and a pressure of 2.5 MPa/G.

The resulting slurry was transferred into a vessel polymerization reactor having an internal volume of 500 L and equipped with a stirrer for further polymerization. The polymerization reactor was supplied with propylene at 15 kg/h and with hydrogen such that the vapor phase had a hydrogen concentration of 0.19 mole percent. Polymerization was performed at a polymerization temperature of 59° C. and a pressure of 2.5 MPa/G.

The resulting slurry was transferred into a vessel polymerization reactor having an internal volume of 500 L and equipped with a stirrer for further polymerization. The polymerization reactor was supplied with propylene at 12 kg/h and with hydrogen such that the vapor phase had a hydrogen concentration of 0.19 mole percent. Polymerization was performed at a polymerization temperature of 58° C. and a pressure of 2.5 MPa/G.

The resulting slurry was transferred into a vessel polymerization reactor having an internal volume of 500 L and equipped with a stirrer for further polymerization. The polymerization reactor was supplied with propylene at 13 kg/h and with hydrogen such that the vapor phase had a hydrogen concentration of 0.19 mole percent. Polymerization was performed at a polymerization temperature of 57° C. and a pressure of 2.4 MPa/G.

The resulting slurry was subjected to vaporization and was subjected to gas-solid separation to yield a propylene homopolymer. After the propylene homopolymer was yielded at 40 kg/h, it was dried in a vacuum at 80° C. to yield a propylene homopolymer (PP7).

The properties of the propylene homopolymer (PP7) thus yielded are shown in Table 1 below.

TABLE 1

| Item | | Unit | Example 1 | Example 2 | Example 3 | Comparative example 1 | Comparative example 2 | Comparative example 3 | Comparative example 4 |
|---|---|---|---|---|---|---|---|---|---|
| Propylene homopolymer | Type of PP | — | PP1 | PP2 | PP3 | PP4 | PP5 | PP6 | PP7 |
| | MFR | g/10 min. | 4.0 | 4.0 | 4.0 | 4.8 | 4.2 | 3.1 | 4.0 |
| | mmmm | — | 0.97 | 0.95 | 0.98 | 0.91 | 0.95 | 0.98 | 0.94 |
| | Integrated amount of elution at 90° C. by CFC | wt % | 0.1 | 0 | 0 | 3.8 | 5.0 | 3.4 | 0.6 |
| | Integrated amount of elution at 100° C. by CFC | wt % | 0.1 | 6.8 | 0 | 75 | 60 | 5.1 | 27 |
| | CFC peak top temperature | ° C. | 116 | 110 | 118 | 101 | 103 | 121 | 115 |
| | CFC half-width | ° C. | 2.8 | 4.1 | 3.8 | 4.7 | 5.7 | 5.8 | 8.7 |
| | Melting point | ° C. | 158 | 155 | 160 | 145 | 148 | 161 | 152 |
| | Chlorine content | wt ppm | <1 | <1 | <1 | <1 | <1 | 2 | <1 |
| | 2,1-Insertion | mol % | 0 | 0 | 0 | 0 | 0.85 | 0 | 0 |
| | 1,3-Insertion | mol % | 0 | 0 | 0 | 0.1 | 0 | 0 | 0 |
| | HI | wt % | 99.5 | 99.0 | 99.8 | 40.0 | 76.0 | 98.0 | 96.0 |
| | CXS | % | 0.5 | 0.5 | 0.3 | 0.4 | 0.8 | 1.4 | 0.5 |
| BDV of stretched film at 80° C. | | V/μm | 690 | 670 | 700 | 580 | 560 | 640 | 640 |

The invention claimed is:

1. A propylene homopolymer for capacitors, satisfying the following requirements (i) to (v) and (ix):
    (i) the melt flow rate (MFR; measured at 230° C. under a load of 2.16 kg according to ASTM D1238) is 1 to 10 g/10 minutes;
    (ii) the meso pentad fraction (mmmm) measured by $^{13}$C-NMR is 0.940 to 0.995;
    (iii) the integrated amount of elution at 90° C. by cross-fractionation chromatography (CFC) using o-dichlorobenzene is 0.5% by weight or less;
    (iv) the melting point measured using a differential scanning calorimeter (DSC) is 152° C. or more;
    (v) the chlorine content is 2 ppm by weight or less; and
    (ix) in an elution temperature-elution volume curve measured by cross-fractionation chromatography (CFC) using o-dichlorobenzene, the maximum peak has a peak top temperature in the range of 105° C. to 130° C. and half width of 7.0° C. or less.

2. The propylene homopolymer for capacitors according to claim 1, further satisfying the following requirement (vi):
    (vi) the sum of the proportion of irregularly bonded unit due to 2,1-insertion of propylene monomer and the proportion of irregularly bonded unit due to 1,3-insertion of propylene monomer in all propylene constituent units determined from a $^{13}$C-NMR spectrum is 0.2 mole percent or less.

3. The propylene homopolymer for capacitors according to claim 1, wherein the propylene homopolymer has been produced using a metallocene catalyst.

4. A stretched film, for capacitors, formed by stretching the propylene homopolymer according to claim 1 at an area stretching ratio (area ratio obtained by length×width) of 30 to 80 times.

* * * * *